United States Patent [19]
Whipple et al.

[11] 3,722,126
[45] Mar. 27, 1973

[54] MARINE HAULING APPARATUS

[75] Inventors: William D. Whipple; Howard W. Gifford, Westport Point, Mass.

[73] Assignee: Prelude Corporation, Westport Point, Mass.

[22] Filed: Nov. 2, 1970

[21] Appl. No.: 86,263

[52] U.S. Cl. ................................................43/6.5
[51] Int. Cl. ..........................................A01k 79/00
[58] Field of Search ........43/6.5, 8, 4, 27.4; 254/137, 254/138, 191

[56] References Cited

UNITED STATES PATENTS

| 1,683,922 | 9/1928 | Rusk | 254/138 |
| 2,875,547 | 3/1959 | Puretic | 43/8 |
| 3,355,835 | 12/1967 | Lyons | 43/6.5 |
| 2,810,980 | 10/1957 | Puretic | 43/8 |
| 3,034,767 | 5/1962 | Gordon | 43/8 |

FOREIGN PATENTS OR APPLICATIONS

| 1,286,120 | 1/1962 | France | 43/8 |

Primary Examiner—Hugh R. Chamblee
Attorney—Enway, Jenney and Hildreth

[57] ABSTRACT

A marine surface vessel hauls a trawl of marine life-harvesting equipment with a first pulley-like unit located and movably jointed for lifting the trawl cable from the sea with minimal disturbance due to motion of the vessel relative to the sea and for separation of the trawl cable from the harvesting equipment attached to it, and with a second pulley-like unit located for positioning both the trawl cable and the harvesting equipment on the vessel for further handling.

20 Claims, 5 Drawing Figures

PATENTED MAR 27 1973

INVENTORS
WILLIAM D. WHIPPLE
HOWARD W. GIFFORD

BY Kenway, Jenney & Hildreth

ATTORNEYS

INVENTORS
WILLIAM D. WHIPPLE
HOWARD W. GIFFORD
BY
Kenway Jenney & Hildreth
ATTORNEYS

MARINE HAULING APPARATUS

BACKGROUND

This invention relates to equipment for hauling a submerged trawl cable from the sea onto a surface vessel and for separating the cable from devices, particularly devices for harvesting marine life, so that the cable and the harvesting devices do not become entangled and can be separately manipulated.

The equipment which the invention provides makes it possible to haul, for example, trawls of lobster traps at comparatively high rates in deeper water than is conventionally fished. The deep water trapping of lobsters, for example in depths in the order of 100 fathoms and more, requires equipment that is more rugged and more highly automated than comparable equipment for operation in the more conventional shallow waters. Otherwise, the deep-water operation is likely to be unprofitable because an insufficient volume of lobsters is obtained, and the equipment breaks and is lost due to the rough seas and large forces encountered in the deep-sea operation.

An object of the invention is to provide improved automated apparatus for hauling a marine line having devices for harvesting marine life suspended from it.

Another object of the invention is to provide apparatus for hauling a marine line having articles suspended from it and which subjects the line to comparatively low disturbances as the hauling vessel maneuvers, even in rough seas.

A further object of the invention is to provide apparatus for hauling a marine line having articles suspended from it and which separates the line from the suspended articles to minimize fouling and so each can be handled separately.

It is also an object of the invention to provide hauling apparatus of the above character capable of operation in water in the order of 100 fathoms or more in depth.

Still another object of the invention is to provide hauling apparatus of the above character characterized by safe and reliable operation in that it subjects the line being hauled and the articles suspended from it to relatively minimal damage, breakage and loss.

Other objects of the invention will in part be obvious and will in part appear hereinafter.

SUMMARY OF INVENTION

As indicated above, the automated hauling in deep water of a submerged marine cable or line having traps or other marine lift-harvesting devices suspended from it at intervals along its length requires equipment capable of continuous operation in heavy seas. Also, it requires equipment that can haul the cable without fouling with the suspended harvesting devices, without subjecting either the cable or the devices to excessive forces that would tear the devices from the cable or that would snap the line itself, resulting in loss of the entire length of unhauled cable and the devices attached to it.

This invention solves these problems by providing marine hauling equipment in which a surface vessel carries a first pulley-like unit, termed a gangion block, disposed over the side of the vessel and mounted with a rotational joint for continuously lifting the line from the sea with minimal disturbance due to motion of the vessel relative to the sea, and for separation of the line from the harvesting devices attached to it. A second similar gangion block on the vessel receives the line from the first gangion block and uniformly positions both the line and the harvesting devices suspended from it for further handling on the vessel. Where the line has lobster pots or other traps suspended from it, a platform extends along the side of the vessel and the two gangion blocks are further positioned to raise the line above the platform and automatically load the traps successively onto the platform, where they are readily accessible for further handling and processing.

The first gangion block is typically disposed above the vessel water line by essentially the length of the secondary or gangion cable attaching each trap to the line. The first gangion block further is located on the vessel for minimal motion relative to the sea when the vessel pitches in heavy seas and turns. This arrangement introduces minimal changes in the cable tension, and in cable position relative to the vessel, during these maneuvers of the vessel. This greatly facilitates continuous hauling operation as the vessel maneuvers, and minimizes the likelihood of snapping the line as it is being hauled in and from otherwise damaging the line and the devices attached to it.

As one measure of the success of the invention, lobster trap hauling equipment constructed in accordance with it can haul a trawl cable of lobster traps in around 100 fathoms of water at such a rapid rate that a minimum of 400 traps can be hauled in one day with enough time left over to reset the traps again that same day. In fact, the equipment has been used in hauling around 550 traps in one day in such a brief time that the same number of traps was then reset in the same day.

The invention accordingly comprises the features of construction, combinations of elements, and arrangement of parts exemplified in the constructions hereinafter set forth, and the scope of the invention is indicated in the claims.

DESCRIPTION OF DRAWINGS

For a fuller understanding of the nature and objects of the invention, reference should be had to the following detailed description, taken in connection with the accompanying drawings, in which.

DESCRIPTION OF ILLUSTRATED EMBODIMENT

Figure 1:
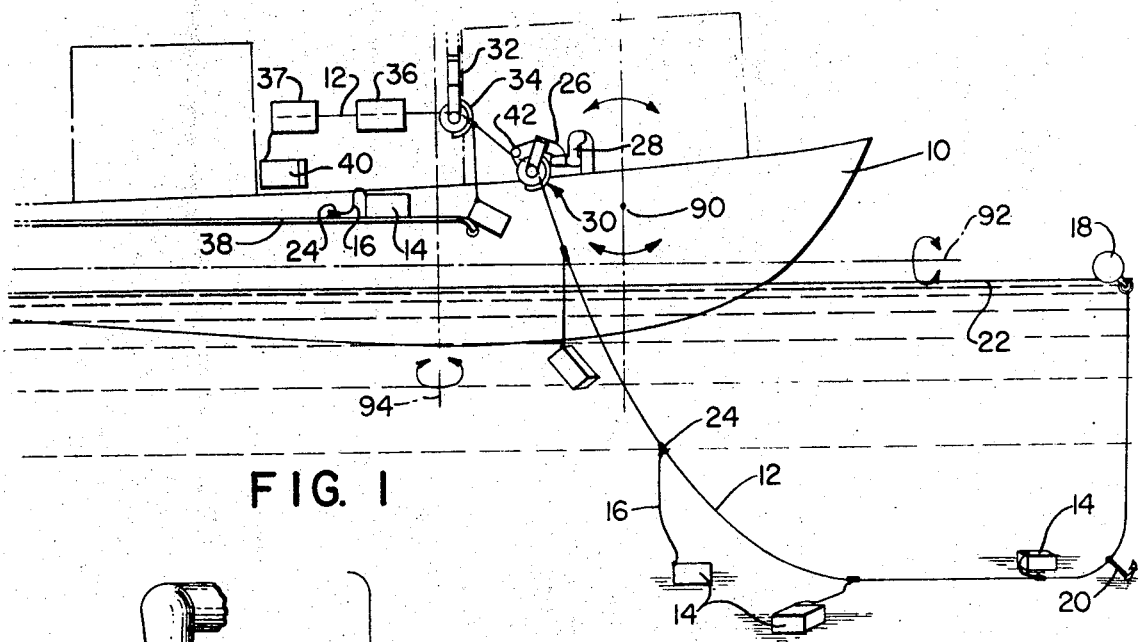
FIG. 1 illustrates hauling apparatus embodying the invention in operation during the hauling of lobster traps.

FIG. 1 shows a marine surface vessel 10 hauling a marine trawl line or cable 12 having lobster traps 14 suspended from it at intervals along its length by means of secondary lines 16 which herein are termed gangion lines. A buoy 18 and anchor 20 are secured at the unhauled end of the cable 12, with the anchor 20 typically at a depth of 100 or more fathoms below the water surface 22. A releasable clip 24 is secured to one end of each gangion line 16 and releasably secures the gangion line and associated trap to the cable 12 with a non-slipping engagement.

The assemblage of the cable 12, and gangion line 16 suspending traps 14 from it by way of the clips 24 is sometimes referred to hereinafter as a trap trawl or, more generally, a harvesting trawl.

Figure 2:
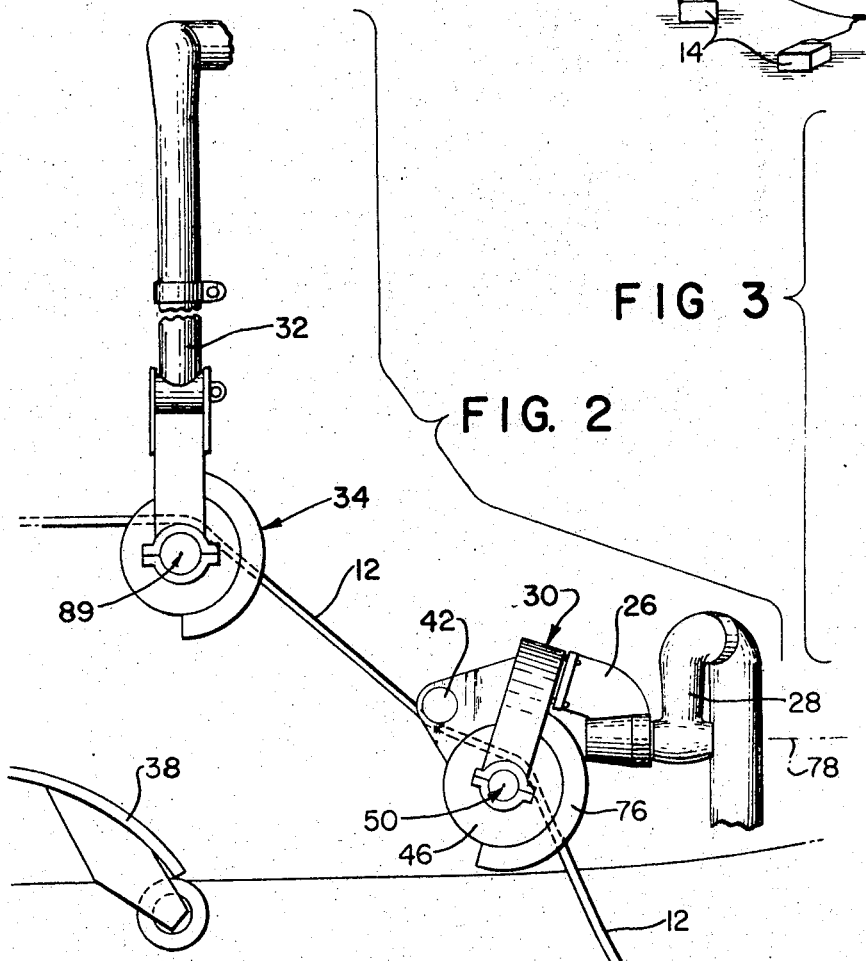
FIG. 2 is a fragmentary side elevation view of hauling equipment shown in FIG. 1.

Two rotatably-joined support arms 26 and 28, FIGS. 1 and 2, mount a forward gangion block indicated at 30 over the side of the vessel 10, and a support arm 32 mounts a second gangion block indicated generally at 34 above and aft of the forward gangion block. The vessel also has a detaching unit 36 and cable-hauling winch or power block unit 37 successively in line with the trawl cable 12 past the second gangion block 34. In addition, a slide platform 38 extends along the side of the vessel rearward from a forward loading end which is disposed below the second gangion block 34.

In operation, after the buoy and anchor (not shown) at the starting end of the trawl cable are hauled aboard, the power block unit 37 commences hauling in the cable 12, drawing it first through the forward gangion block 30, then successively through the second gangion block 34 and through the detacher 36. Hauled line from the power block unit is fed into a bin 40. Passage of the line 12 through the block 30 raises the line from the ocean bottom and lifts it from the water, with the gangion lines 16 and the traps 14 hanging from it. As described hereinafter, each gangion block 30 and 34 is constructed with a pair of sheaves forming an axially-split wheel that supports the large diameter trawl cable 12 but leaves the gangion lines 16 free to pass through the gangion block suspended from the cable. (U.S. Pat. No. 587,839 discloses a rudimentary construction for the gangion blocks, but without the features described below.) An idler sheave 42 depresses the line 12 slightly as it passes out of the gangion block 30 and on to the second gangion block 34, which further raises the trawl cable 12 to lift the traps 14 suspended from it onto the load end of the platform 38. As the line is hauled in from the second gangion block to the detacher unit 36, the traps slide with it rearward along the platform 38.

The detaching unit 36 automatically releases each clip 24, allowing it to be removed from the advancing trawl cable 12 and thereby enabling the clip together with the gangion line 16 and trap 14 connected to it to be removed from the trawl cable prior to entry of the cable into the power unit 37.

Thus, as shown in FIG. 1, the gangion blocks 30 and 34 not only raise the trawl line 12 and guide it onto the vessel 10, but their construction automatically separates the trawl line from the structure suspended from it, and the detaching unit 36 disconnects this structure from the trawl line so that a conventional power unit 37 can continuously haul in the trawl cable with the traps 14.

After passage of the trawl cable through the detaching unit 36, the traps 14 with the gangion lines 16 and clips 24 attached to them are free for processing on the vessel 10 independent and separate from the cable. Gangion line clips 24 and a detaching unit 36 suitable for use with the hauling equipment have been constructed by the assignee hereof, Prelude Corporation of Westport Point, Mass.

Figure 4:
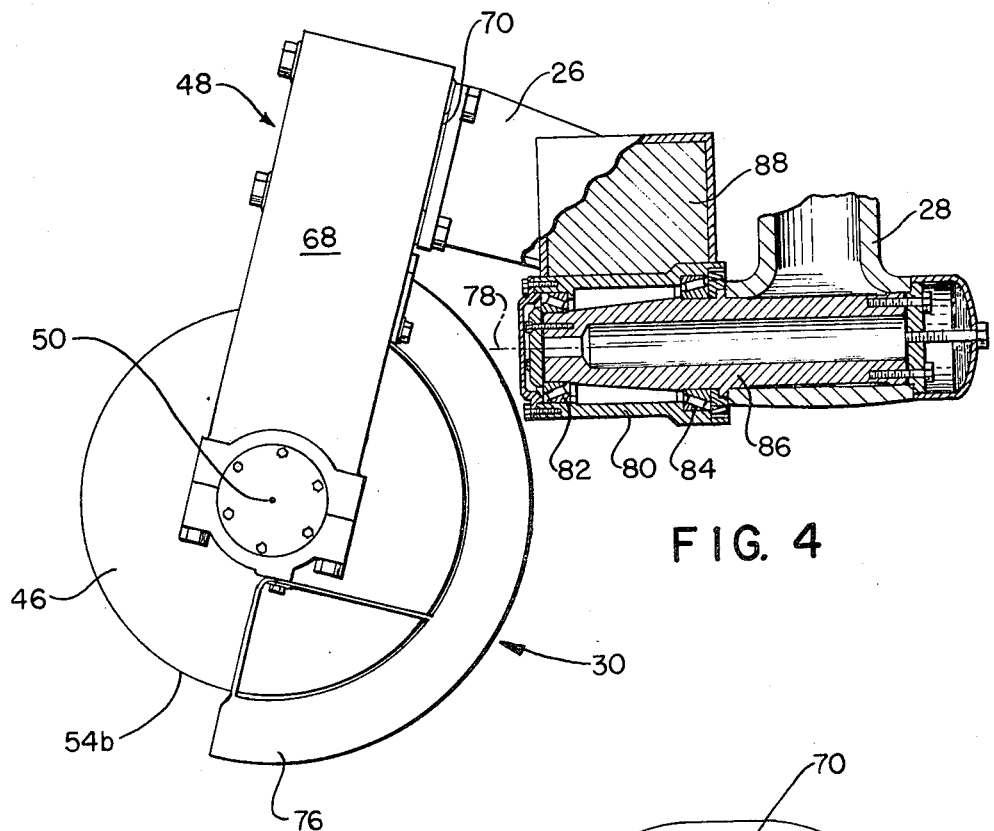
FIG. 4 is an enlarged side view, partly broken away, of the forward gangion block of FIG. 2.
Figure 5:
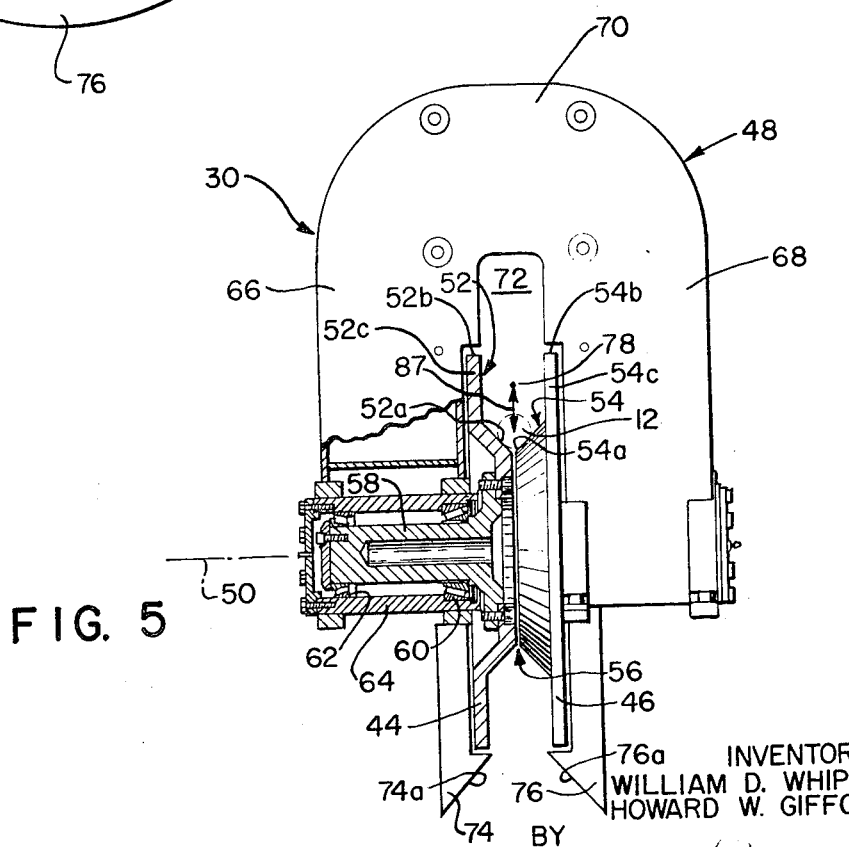
FIG. 5 is an end view of the gangion block of FIG. 4, partly in section.

FIGS. 4 and 5 show the construction of the illustrated gangion block 30 and of the support arms 26 and 28 that mount it to the vessel 10. The gangion block has two identical sheave members 44 and 46 mounted on a frame 48 for independent rotation about the same axis 50, hereinafter sometimes termed the sheave axis. Each sheave member has a peripheral surface 52, 54 flared radially outward from an inner rim edge 52a, 54a to an outer rim edge 52b, 54b, respectively. The flare of each illustrated sheave member is a conical surface extending outwardly from the inner rim edge to a straight flange 52c, 54c that forms the outer rim edge.

The sheave members 44 and 46 are mounted on the frame 48 in face-to-face relation to form together a cable-guiding wheel with a peripheral groove formed by the two flared surfaces 52 and 54, but with a clearance space 56 between the inner rim edges 52a and 54a. Thus, the cable-guiding wheel which the two sheave members form is axially-split by the space 56, in addition to being peripherally-grooved. As shown in FIG. 5, the trawl cable 12 rests in the groove, but a gangion line secured to it is free to depend from the cable in the space 56 as the cable passes through the gangion block 30.

The sheave member 44 has a spindle 58 extending away from the sheave member 46 centered on the sheave axis 50. Bearings 60 and 62 mount the spindle 58 and hence the sheave member 44 within a bearing housing 64 at the end of one arm 66 of the frame 48. The sheave member 46 is constructed like the sheave member 44 with a spindle journaled to a bearing housing on a frame arm 68. The illustrated frame has an over-all U-shape with the arms 66 and 68 extending from a frame base portion 70 closely about opposite sides of the two sheave members.

The frame arms 66 and 68 extend upward, in the orientation of FIG. 5, beyond the sheave member outer rim edges 52b, 54b to the frame base portion 70 to form a bounded guide space 72 above the sheave members. When a clip 24 is hauled through the gangion block 30, it extends into this guide space and it lifts the cable 12 up into this space from the groove formed by the two sheave members. However, the arms 66 and 68 form the guide space 72 with a width the same as the width between the sheave member outer rim edges 52b, 54b, so that when the clip passes beyond the gangion block the cable 12 again falls down into the groove between the two sheave members, thereby remaining seated on the gangion block.

As further shown in FIGS. 4 and 5, the illustrated gangion block 30 has a pair of shrouds 74 and 76 secured to the frame 48 adjacent and associated with the sheave members 44 and 46, respectively. Each shroud has a surface 74a, 76a flaring outward from adjacent the outer rim edge 52b, 54b of the associated sheave member. As shown in FIGS. 1 and 4, the illustrated shrouds extend only part way, e.g., nearly half way, around the sheave members on the side of the gangion block 30 from which the trawl cable 12 enters it.

This arrangement of the shrouds forms a funneling entry into the gangion block sheave members. This assures that each clip on the trawl cable is in the proper orientation for ready passage through the gangion block, even where the trawl cable is momentarily slack and even whipping sideways, as can occur when the vessel is in a heavy sea. The gangion block 30 as thus constructed and shown in FIGS. 4 and 5 is constructed of hard-surfaced, strong and corrosion-resistant materials, usually metal. Further, the circular sheave member surfaces radially inward from the inner rim edges 52a and 54a and which bound the clearance space 56 preferably are hard-faced to minimize wear from the gangion lines passing thereby.

The second gangion block 34 of FIG. 1 preferably is constructed in the same manner as the gangion block 30.

As also shown in FIGS. 4 and 5, the support arms 26 and 28 mount the forward gangion block 30 for rotation about a second axis 78, referred to sometimes as the gangion axis, transverse to the sheave axis 50 and aligned generally with, or slightly to the side from, the length of the vessel 10. Specifically, the illustrated arm 26 attaches to the base portion 70 of the gangion block frame 48 and supports the frame with the arms 66 and 68 suspended downwardly below the base portion. The arm 26 extends from the frame in the horizontal forward direction relative to the vessel 10, and extends downward to dispose a bearing housing 80 at its lower end below its juncture with the frame 48. This extension of arm 26 disposes the gangion block 30 aft of the arms 26 and 28 and centers the bearing housing on the axis 78 between, in the plane of FIG. 4, the connection of the arm 26 with the gangion block frame 48 and the sheave axis 50.

The support arm 28 extends laterally from the vessel 10, as shown in FIG. 1, to a spindle 86 centered on the gangion axis 78. The spindle is rotatably fixed to and seated in the bearing housing 80, with bearings 82 and 84, to join the arms 26 and 28.

With this construction, the gangion axis 78 is above the sheave axis 50 and is also above the engagement of trawl cable 12 with the sheave members by a moment arm 87 indicated in FIG. 5. However, the axis 78 preferably is not far above this engagement of the trawl cable with the sheave members, so that the moment arm 87 is small. The small moment arm minimizes displacement of the ground line from the desired hauling path as the gangion block rotates about the axis 78. Thus, the illustrated gangion block-mounting arms 26 and 28 locate the gangion axis 78 spaced above the sheave axis 50 by a distance, as measured between two parallel planes each lying along one axis, less than the radius of the outer rim edge 52b but greater than the radius of the inner rim edge 52a.

To reduce the sideways force required to turn the gangion block about the axis 78, the center of gravity of the conjoined gangion block 30 and arm 26 is preferably closely below the axis 78. Normally the center of gravity is far below this axis. Accordingly, a counterweight is provided above the rotation axis 78. FIG. 4 shows the counterweight 88 in the form of lead poured in a molten state into the normally-hollow structure of the arm 26 above its engagement with the shaft 86 of arm 28, i.e., above the axis 78.

Figure 3:
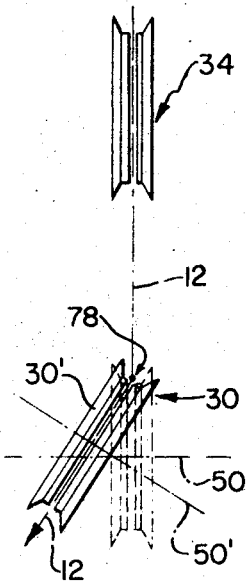
FIG. 3 is a simplified schematic end elevation view of the gangion blocks of FIGS. 1 and 2.

FIG. 3 illustrates in schematic form the desired rotation of the gangion block 30 about the axis 78 that results with the foregoing construction. Normally the two gangion blocks 30 and 34 are both in an upright orientation, illustrated with dashed lines for block 30. However, when the vessel 10 turns or departs from a level orientation as due to high seas, so that the trawl cable 12 is being hauled not straight upwards but from the side, as indicated in FIG. 3, the gangion block 30 rotates from the normal upright position to a position as shown in solid lines. That is, the gangion block 30 trails the lateral direction of entry of the hauled trawl cable. Moreover with the foregoing small moment arm 87 and with the counterweight 88 in the gangion block assembly, the gangion block 30 rotates about the axis 78 with relatively little lateral force on the trawl cable. This is desired to ensure that the trawl cable enters the gangion block 30 smoothly and remains seated between the sheave members thereof, and, moreover, is desired to ensure proper entry of the clip and gangion line into the gangion block 30.

FIG. 3 also illustrates that with the preferred construction of the gangion block 30 described above, the trawl line 12 exits from the gangion block 30 essentially directly underneath the second gangion block 34 substantially independent of the rotation of the gangion block 30 about the axis 78. This is desired to ensure smooth passage of the trawl line 12 over the gangion block 34. Further, the idler sheave 42, FIGS. 1 and 2, ensures that the cable 12 remains seated in the gangion block 30 groove, except when a clip 24 passes through the block.

With further reference to FIGS. 1, 2 and 3, the support arm 32 mounts the second gangion block 34 outboard of the vessel and higher than the forward block 30. The sheave rotation axis 89 for this block 34 is parallel to the normal orientation of the block 30 sheave axis 50.

In addition to being constructed with a gangion rotation axis 78 oriented and located as described above, the gangion blocks 30 and 34 are located relative to each other and to the vessel 10 as is now described with reference to FIG. 1 and to FIG. 2, which shows in greater detail the gangion blocks and the load end of the platform 38 on the vessel 10.

The vessel 10 turns about a normally-vertical turning axis 90 indicated in FIG. 1, and rolls from side to side in heavy seas about a normally-horizontal roll axis 92 aligned between the vessel bow and stern. Further, the vessel pitches forward and backward in heavy seas about a normally-horizontal pitch axis 94 transverse to the turn and roll axes and hence extending between the port and starboard sides of the vessel. Motion of the vessel 10 about each of these three axes moves the forward gangion block relative to the trawl cable being hauled from the water and hence changes, in most instances, the tension in the cable and/or the angle at which it arrives at the forward gangion block. As already discussed, the forward gangion block is mounted for rotation about axis 78 to maintain alignment with the incoming trawl line 12. The forward gangion block is ideally located along the length of the vessel close to the turn axis 90 and close to the pitch axis 94. However, as illustrated in FIG. 1, these two axes 90 and 94 of the vessel 10 do not intersect, but rather are spaced a considerable distance apart along the length of the vessel. Accordingly in accordance with the invention, the forward gangion block 30 ideally is located along the length of the vessel with the sheave rotation axis 50 between the two vessel axes 90 and 94, and preferably either midway between them or somewhat closer than that to the turn axis 90. That is, it is considered more important to minimize relative movement between the incoming trawl line and the forward gangion block due to turning of the vessel 10 than due to pitching.

The two gangion blocks 30 and 34 further are located on the vessel 10 to lift a trap 14 from the water at the time the clip 24 securing it to the trawl cable is passing from the forward gangion block 30 to the second block 34. The forward gangion block 30 preferably is spaced above the vessel water line by the length of the gangion lines 16 plus half the trap length, so that as a clip 24 passes through the forward block 30, the trap suspended from it is roughly half-way out of the water.

Further, it is desirable that the trap 14 be placed on the platform 38 soon after it is lifted free from the water surface 22. Accordingly, to diminish the time during which the trap is suspended in the air and hence susceptible to damage by swinging against the side of the vessel 10, the forward gangion block 30 is located slightly forward of the front of the platform 38 and the second gangion block 34 is located closely directly above the forward end of the platform.

The term "cable" is used herein in a broad generic sense and hence includes cables, ropes, lines and the like.

It will thus be seen that the objects set forth above, among those made apparent from the preceding description, are efficiently attained. These objects include the provision of apparatus for hauling a trawl or other cable having articles suspended from it and for changing the direction of the hauled cable in such a manner that the suspended articles pass essentially freely by the cable-guiding structure without fouling.

Another object, in addition to those set forth hereinabove, is to provide trawl and like cable-hauling apparatus of the foregoing character for continuous operation. The attainment of this objective by the present invention avoids the need to maneuver the surface vessel repeatedly, as is generally required when a hauling operation is interrupted, and/or resumed. Further, the continuous hauling made possible by this invention minimizes large changes in the cable tension. Such tension changes, which often occur when hauling is interrupted and/or resumed, tend to foul the trawl equipment and increase the likelihood of snapping the trawl cable itself.

It should be noted that the illustrated gangion block 30 and the arm 26 (FIGS. 2, 4 and 5) employ a preferred construction in that they are compact in the plane of rotation about axis 78. This construction thus minimizes the size of the block-and-arm assemblage in both directions orthogonal to axis 78, to give the assemblage a small radius of gyration about axis 78. That is, the assemblage has low rotational inertia.

It further should be noted that, in general, it is desirable in accordance with the invention that the cable 12 leave the forward gangion block 30 at a relatively small angle above the horizon. This arrangement removes, or separates, gangion lines and traps from the section of the cable 12 approaching the block 30 and adjacent them, for the purpose of minimizing the likelihood of fouling. The invention attains this objective by the use and location of the second gangion block 34, and further by the idler sheave 42 which depresses the cable 12 leaving the block 30 further toward the horizontal.

Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by letters patent is:

1. Apparatus for carrying on a marine vessel for guiding a cable, from which are suspended secondary cables carrying marine equipment, during the hauling of the cable onto the marine vessel, said apparatus comprising:

A. first and second sheave members
   1. each of which has a peripheral surface flaring radially outward from a first rim edge to a second rim edge axially spaced from said first edge,
   2. disposed face to face with proximal first rim edges spaced apart, to form an open cable-passing clearance space therebetween, along a common first axis about which each is rotatable and along which said rims thereof are spaced apart, thereby forming a wheel with said peripheral surfaces together forming a grooved peripheral cable-bearing wheel surface for guidingly supporting said cable during the hauling thereof with said secondary cables passing within said clearance space,
B. a first mounting member supporting said sheave members for said rotation about said first axis, and
C. a second mounting member rotatably joined to said first mounting member to allow rotation of said first mounting member with said sheave members thereon relative to said second mounting member about a second axis transverse to said first axis.

2. Apparatus as defined in claim 1 further comprising means joining together said first and second mounting members with said second axis spaced from said first axis, as measured between two parallel planes each of which passes through a different one of said transverse axes, by a distance greater than the minimum radius of said peripheral wheel surface.

3. Apparatus as defined in claim 1 further comprising means joining together said first and second mounting members with said second axis spaced from said first axis, as measured between two parallel planes each of which passes through a different one of said transverse axes, by a distance less than the largest radius of said peripheral wheel surface.

4. Apparatus as defined in claim 1 further comprising counterweight means carried on said first mounting member and located to provide the conjoined sheave members and first mounting member with a center of gravity disposed vertically below said second axis by a distance substantially not greater than the largest radius of said sheave members.

5. Apparatus as defined in claim 1 in which each said sheave member further comprises a spindle extending in the direction of said first axis away from said other sheave member and rotatably mounted with said first mounting member.

6. Apparatus as defined in claim 1:
   A. in which said first mounting member forms a frame having a base portion and first and second arms extending from said base portion side-by-side in a spaced-apart relation on either side of said sheave members and each mounting the same-numbered sheave member for rotation about said first axis, and rotatably joined for said rotation about said second axis to said second mounting member at said base portion thereof, and
   B. further comprising a pair of first and second shroud members mounted on said frame and each having a flared guide surface extending at least partially around the same-numbered sheave member and oriented with the flare of said guide surface opening away from the differently-numbered sheave member.

7. Apparatus for mounting on a marine vessel for guiding a cable, from which are suspended secondary cables carrying marine equipment, during the hauling of the cable onto the vessel by cable hauling of the cable onto the vessel by cable hauling means on the vessel, said apparatus comprising:
   A. first and second openly spaced-apart sheave members
      1. each of which has a radially flaring peripheral surface, and
      2. each of which is rotatable about a common first axis and is disposed face to face and spaced apart, by an open cable-passing clearance space, along said first axis to form a wheel with said peripheral surfaces thereof together forming a peripheral wheel surface for guidingly supporting said cable above the passage thereof to said hauling means,
   B. a first mounting member for supporting said sheave members for said rotation about said first axis, and
   C. a second mounting member rotatably joined to said first mounting member for rotation of said first mounting member, with said sheaves thereon, relative to said second mounting member about a second axis transverse to said first axis,
   D. said first and second mounting members being joined together with said second axis spaced from said first axis, as measured between two parallel planes each of which passes through a different one of said transverse axes, by a distance greater than the minimum radius of said peripheral wheel surface and less than the largest radius of said wheel surface.

8. Apparatus as defined in claim 7 in which each said sheave member has a conical peripheral surface with a smaller radius at a first rim edge thereof than at a second rim edge thereof spaced along said first axis from said first rim edge and in which said first and second sheave members are disposed with said first rim edges proximal to each other across said clearance space.

9. Apparatus for hauling onto a marine surface vessel a submerged cable from which are suspended secondary cables carrying marine life-harvesting equipment, said apparatus including cable hauling means for reeling the cable onto the vessel and comprising:
   A. first and second face-to-face sheave members rotatable about a common, first normally-horizontal axis and spaced apart therealong by an unobstructed clearance space to form a peripherally-grooved and axially-split wheel for guiding the cable in the passage thereof from the water to said hauling means and with each said secondary cable free to suspend from the wheel-guided cable through said space, and
   B. means for mounting said sheave members along the side of the vessel above the normal water line thereof and with said first axis in a normally-horizontal disposition and extending transversely to the length of the vessel.

10. Hauling apparatus as defined in claim 9 in which said mounting means disposes said sheave members over the side of said vessel and for rotation relative to the vessel about a second normally-horizontal axis transverse to said first axis.

11. Hauling apparatus as defined in claim 10 in which said mounting means is further characterized as suspending said sheave members with the cable-guiding wheel groove disposed below said second axis.

12. Hauling apparatus as defined in claim 9 in which said mounting means disposes said sheave members over the side of said vessel and located intermediate the vertical vessel-turning axis and the horizontal vessel-pitching axis.

13. Hauling apparatus as defined in claim 9 in which said mounting means disposes said sheave members over the side of said vessel and proximate to the axis about which said vessel turns.

14. Apparatus for hauling onto a marine surface vessel a submerged cable from which are suspended secondary cables carrying marine lift-harvesting equipment, said apparatus comprising:
   A. a marine surface vessel,
   B. a platform on said vessel having at least a portion thereof accessible from the side of said vessel above the vessel water line,
   C. first and second face-to-face sheave members rotatable about a first normally-horizontal axis and spaced apart therealong by a clearance space to form a first axially-split wheel for guiding the cable passing from the water to said vessel and with said secondary cables free to suspend from the wheel-guided cable through said space,
   D. means mounting said sheave members along the side of said vessel above the vessel water line and horizontally spaced to the side of said accessible portion of said platform and with said first axis in a normally-horizontal disposition and extending substantially transverse to the length of said vessel, and
   E. cable hauling means on said vessel for hauling cable from the water onto said vessel along a path such that the cable is unguided in passing from the water to said first wheel and passes from said first wheel to said hauling means over said platform.

15. Hauling apparatus as defined in claim 14 in which said means mounting said sheave members disposes said sheave members with said first axis proximal to the vessel turn axis.

16. Hauling apparatus as defined in claim 14 in which said means mounting said sheave members disposes them with said first axis intermediate the vertical vessel-turning axis and the normally-horizontal vessel-pitching axis.

17. Hauling apparatus as defined in claim 14 further comprising:
A. third and fourth face-to-face sheave members rotatable about a further normally-horizontal axis and spaced apart therealong by a clearance space to form a second axially-split wheel for guiding the cable passing to said hauling means and with said secondary cables free to suspend from said cable guided thereby through said space, and
B. means for mounting said third and fourth sheave members on said vessel higher than said first and second sheave members and intermediate said first and second sheave members and said cable hauling means and disposed over said platform.

18. Marine hauling apparatus as defined in claim 14 in which said mounting means pivotally joins said first and second sheave members to said vessel for rotation thereof relative to said vessel about a second axis extending along the vessel length.

19. Marine hauling apparatus as defined in claim 18:
A. in which said mounting means for said first and second sheave members disposes said sheave members intermediate the vessel turning axis and the vessel pitch axis,
B. further comprising third and fourth face-to-face sheave members rotatable about a further normally-horizontal axis and spaced apart therealong by a clearance space to form a second axially-split wheel for guiding cable passing to the vessel from said first and second sheave members and with said secondary cables free to suspend from the second wheel-guided cable through said space thereof, and
C. further comprising means for mounting said third and fourth sheave members along the side of said vessel above said first and second sheave members and above said portion of said platform with said further axis in a disposition transverse to the length of said vessel.

20. Apparatus for hauling onto a marine surface vessel a submerged cable from which are suspended secondary cables carrying marine life-harvesting equipment, said apparatus including cable hauling means for reeling the cable onto the vessel and comprising:
A. first and second face-to-face sheave members rotatable about a common, first normally-horizontal axis and spaced apart therealong by a clearance space to form a peripherally-grooved and axially-split wheel for guiding the cable in the passage thereof from the water to said hauling means and with each said secondary cable free to suspend from the wheel-guided cable through said space,
B. means for mounting said sheave members along the side of the vessel above the normal water line thereof and with said first axis in a normally-horizontal disposition and extending transversely to the length of the vessel, and
C. means for disconnecting said secondary cables from said hauled cable intermediate said sheave members and said hauling means.

* * * * *